(12) United States Patent
Veprinsky et al.

(10) Patent No.: US 7,751,398 B1
(45) Date of Patent: Jul. 6, 2010

(54) TECHNIQUES FOR PRIORITIZATION OF MESSAGING TRAFFIC

(75) Inventors: Alexandr Veprinsky, Brookline, MA (US); Ramprasad Shetty, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 438 days.

(21) Appl. No.: 11/729,166

(22) Filed: Mar. 28, 2007

(51) Int. Cl.
*H04L 12/28* (2006.01)
*H04L 12/56* (2006.01)

(52) U.S. Cl. ............. 370/392; 370/395.42; 370/395.52
(58) Field of Classification Search ................ 370/389, 370/392, 395.42, 395.52
See application file for complete search history.

(56) References Cited

U.S. PATENT DOCUMENTS

| | | | |
|---|---|---|---|
| 5,544,347 A | 8/1996 | Yanai | |
| 5,742,792 A | 4/1998 | Yanai | |
| 6,157,991 A | 12/2000 | Arnon | |
| 6,449,251 B1 | 9/2002 | Awadallah et al. | |
| 6,898,685 B2 | 5/2005 | Meiri et al. | |
| 6,910,075 B2 | 6/2005 | Marshak et al. | |
| 6,965,592 B2 | 11/2005 | Tinsley et al. | |
| 6,967,927 B1 * | 11/2005 | Dugeon et al. ........... 370/236.1 |
| 6,968,369 B2 | 11/2005 | Veprinsky et al. | |
| 2004/0205309 A1 * | 10/2004 | Watanabe .................. 711/161 |
| 2006/0075404 A1 * | 4/2006 | Rosu et al. ................. 718/100 |
| 2006/0155836 A1 * | 7/2006 | Chang et al. ............... 709/223 |
| 2007/0169179 A1 * | 7/2007 | Narad ........................... 726/4 |
| 2007/0297375 A1 * | 12/2007 | Bonta et al. ................ 370/338 |

FOREIGN PATENT DOCUMENTS

EP        1 298 530 A1     4/2003

OTHER PUBLICATIONS

"f5. The World Runs Better with F5", WANJet®, © 1998-2007 F5 Networks, Inc. website (1 p.).
"Cisco ICM Enterprise Edition Pre-installation Planning Guide", ICM Enterprise Edition Release 6.0(0), May 2004 (4 pp.).

* cited by examiner

*Primary Examiner*—Alpus H Hsu
*Assistant Examiner*—Saad Hassan
(74) *Attorney, Agent, or Firm*—Muirhead and Saturnelli, LLC

(57) ABSTRACT

Described are techniques for prioritizing messaging traffic. A first message having a second message encapsulated in a payload of the first message is received. It is determined whether the first message meets one or more prioritization criteria in accordance with one or more portions of a payload of the second message.

19 Claims, 16 Drawing Sheets

| Version 272 | .. .. | Source Address 274 | Destination Address 276 | .. .. |
|---|---|---|---|---|

| Source Port 282 | Destination Port 284 | Data offset 286 | .. .. |

TECHNIQUES FOR PRIORITIZATION OF MESSAGING TRAFFIC

BACKGROUND

1. Technical Field

This application generally relates to messaging traffic, and more particularly to techniques used in connection with prioritizing messaging traffic.

2. Description of Related Art

Computer systems and other components may be interconnected by one or more communication connections in a network configuration. The network may support transmissions in accordance with well-known protocols such as TCP/IP (Transmission Control Protocol/Internet Protocol), UDP (User Datagram Protocol), and the like. It may be desirable to provide a prioritization technique for use in connection with prioritizing the messaging traffic in a network. One existing technique may provide for prioritization based on known pre-assigned destination port numbers. The port number may be found, for example, in the TCP header of a TCP message. One drawback of using pre-assigned port numbers is that malicious users may set their applications to use this port number or an application may unintentionally specify one of the pre-assigned prioritized port numbers when the application should not. Another technique for systems using the IPv4 protocol includes performing prioritization based on the Type of Service field included in the IP header. Another technique for systems using the IPv6 protocol includes performing prioritization based on the flow label included in the IP header.

SUMMARY OF THE INVENTION

In accordance with one aspect of the invention is a method for prioritizing messaging traffic comprising: receiving a first message having a second message encapsulated in a payload of the first message; and determining whether the first message meets one or more prioritization criteria in accordance with one or more portions of a payload of the second message. The first message may be in accordance with a network layer protocol. The second message may be in accordance with a transport layer protocol. The first message may be in accordance with an internet protocol and the second message may be in accordance with a transport control protocol. The step of determining whether the first message meets one or more prioritization criteria may be in accordance with one or more portions of a payload of the second message and a predetermined port number included in a header of the second message. The method may also include determining whether the second message includes a third message encapsulated in the payload of the second message using said one or more portions of the payload of the second message. The one or more portions of the payload of the second message may further comprise a marker field including a predefined value, a message header checksum including a checksum over a header portion having an expected size of a third message encapsulated in the payload of the second message, and a version identifier identifying a format version of said third message. The method may also include determining if the one or more portions of the payload of the second message include valid values; if the one or more portions include valid values, determining that the payload of the second message includes a third message encapsulated therein in accordance with a messaging protocol; and giving priority to said first message over other messages not having a message encapsulated therein in accordance with the messaging protocol. The messaging protocol may be for a remote data facility and the first message may be messaging traffic between data storage systems over a network. If the first message meets one or more prioritization criteria in accordance with one or more portions of the payload of the second message, it may be determined that the first message is messaging traffic between data storage systems over a network in accordance with a protocol for a remote data facility, and the first message may be given priority over other messages not in accordance with the protocol for the remote data facility. The prioritization criteria may be included in one or more rules of a traffic prioritization policy. The traffic prioritization policy may include one or more rules for prioritizing message traffic based on a type of messaging traffic in accordance with the protocol of said remote data facility. The traffic prioritization policy may include a rule for prioritizing based on a device for an I/O operation indicating in said payload of the second message. The traffic prioritization policy may include a rule for prioritizing based on whether a message is management traffic for performing a data storage management operation or data traffic for performing an operation related to user data. The remote data facility may provide for automatically copying data from a first device to a second device in response to changes made to data on the first device, and the traffic prioritization policy may include a rule for prioritizing based on whether a message is a message including a command to modify data on the first device or a message including a command to update said second device in response to changes to said first device. The remote data facility may provide for automatically copying data from a first device to a second device in response to changes made to data on the first device, and the traffic prioritization policy may include a rule for prioritizing based on whether messaging traffic is for performing said copying in accordance with a synchronous mode or an asynchronous mode, wherein, when in the asynchronous mode, said host receives an acknowledgment regarding said copying after data is committed to said first device and, when in the synchronous mode, said host receives an acknowledgment regarding said copying after data is committed to said second device.

In accordance with another aspect of the invention is a system comprising: two or more data storage systems connected by a network; at least one network component performing prioritization of messaging traffic between said two or more data storage systems, wherein the at least one network component includes executable code stored on a computer readable medium for: receiving a first message including a first header and a first payload, said first payload comprising a second message including a second header and a second payload; determining whether said second payload includes a third message comprising a third header and third payload in accordance with a messaging protocol, said determining being performed using one or more portions of said third header and a portion of said second header; in response to determining that said first message includes a third message in accordance with said messaging protocol, prioritizing said first message over other messaging traffic not in accordance with said messaging protocol. The network may handle messaging traffic in accordance with TCP/IP. The messaging protocol may be a protocol associated with a remote data facility that automatically copies data from a first device to a second device in response to changes made to data on the first device.

In accordance with another aspect of the invention is a computer readable medium comprising executable code stored thereon for prioritizing messaging traffic, the computer readable medium comprising executable code for: receiving a first message having a second message encapsulated in a payload of the first message; and determining whether the first message meets one or more prioritization criteria in accordance with one or more portions of a payload of the second message.

BRIEF DESCRIPTION OF THE DRAWINGS

Features and advantages of the present invention will become more apparent from the following detailed description of exemplary embodiments thereof taken in conjunction with the accompanying drawings in which:

FIG. 6 is an example representation of an IP header;

FIG. 7 is an example representation of a TCP header;

DETAILED DESCRIPTION OF EMBODIMENT(S)

Figure 1:
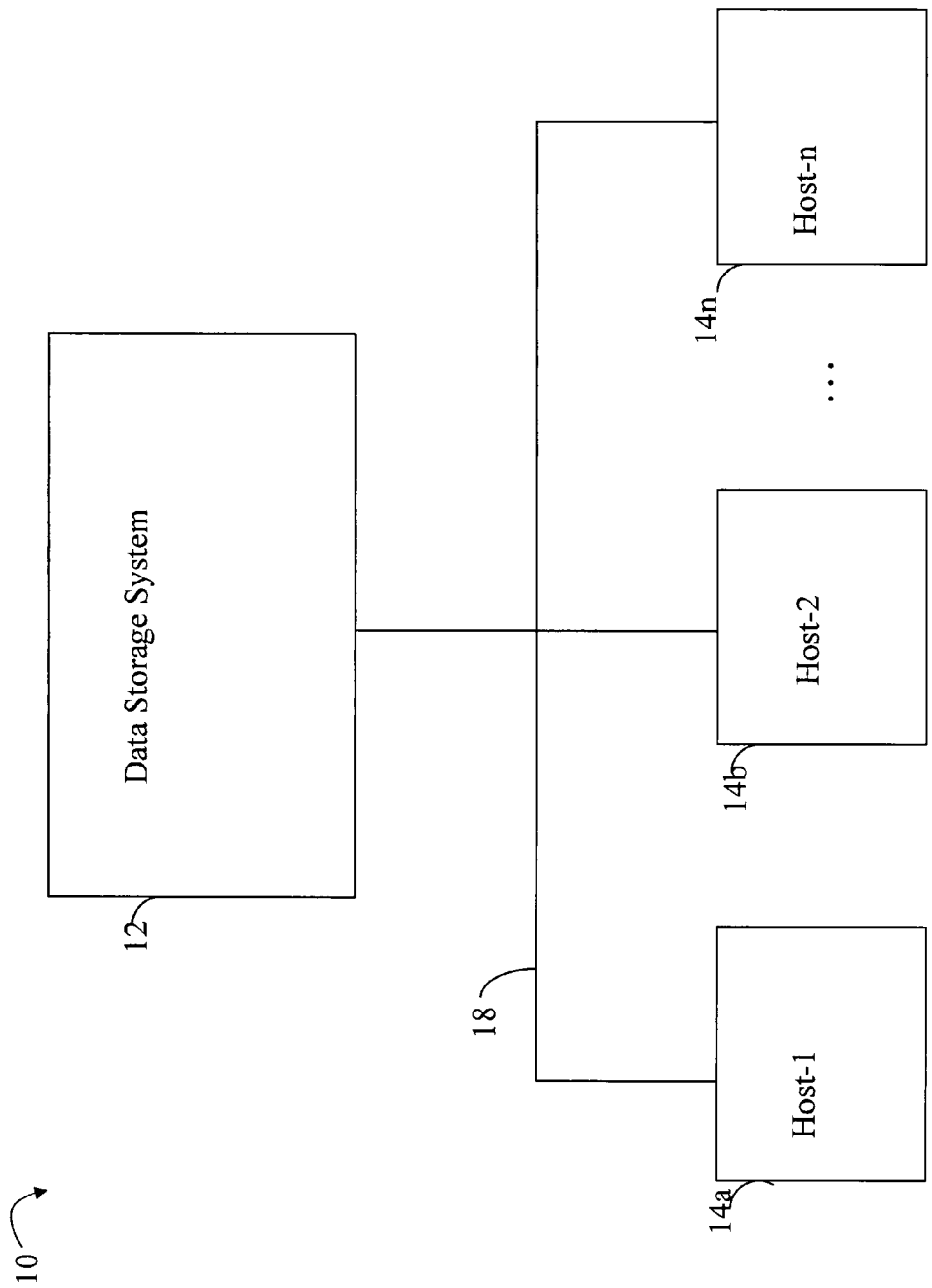
FIG. 1 is an example of an embodiment of a computer system that may utilize the techniques described herein.

Referring now to FIG. 1, shown is an example of an embodiment of a computer system that may be used in performing the techniques described herein. The computer system 10 includes a data storage system 12 connected to host systems 14a-14n through communication medium 18. In this embodiment of the computer system 10 and the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the computer system 10.

Each of the host systems 14a-14n and the data storage system 12 included in the computer system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the computer system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as a Connectrix or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
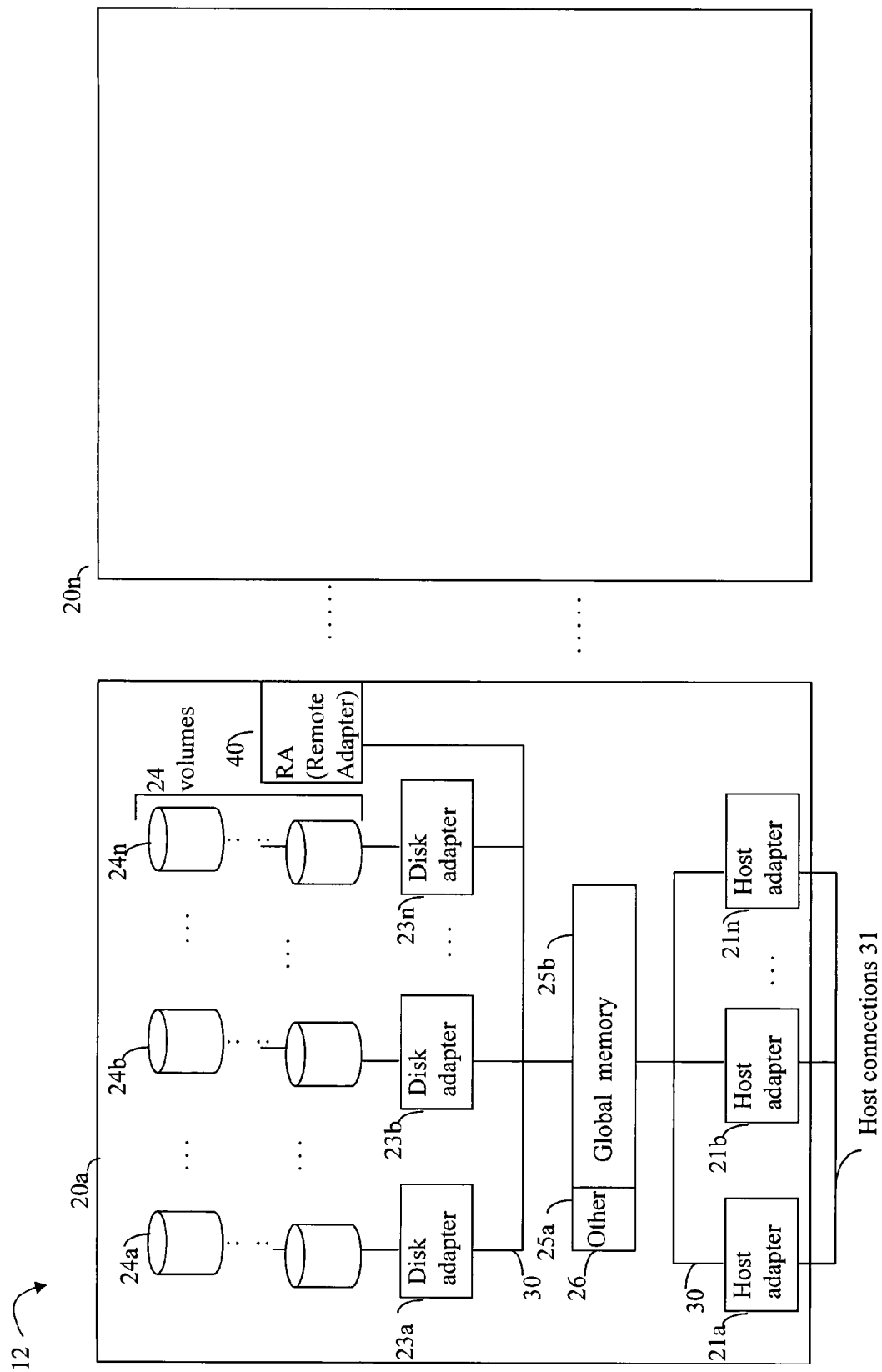
FIG. 2A is an example of an embodiment of a data storage system.

Referring now to FIG. 2A, shown is an example of an embodiment of the data storage system 12 that may be included in the computer system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the computer system 10 of FIG. 1 to provide storage services to, for example, host computer systems.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a.

The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet transmission channel supporting TCP/IP traffic. The RA may be hardware including a processor used to facilitate communication between data storage systems, such as between two Symmetrix data storage systems. The RA may be used with the Remote Data Facility (RDF) product provided by EMC Corporation of Hopkinton, Mass.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon.

The DA performs I/O operations on a disk drive. In the following description, data residing on an LV may be accessed by the DA following a data request in connection with I/O operations that other directors originate.

Figure 2B:
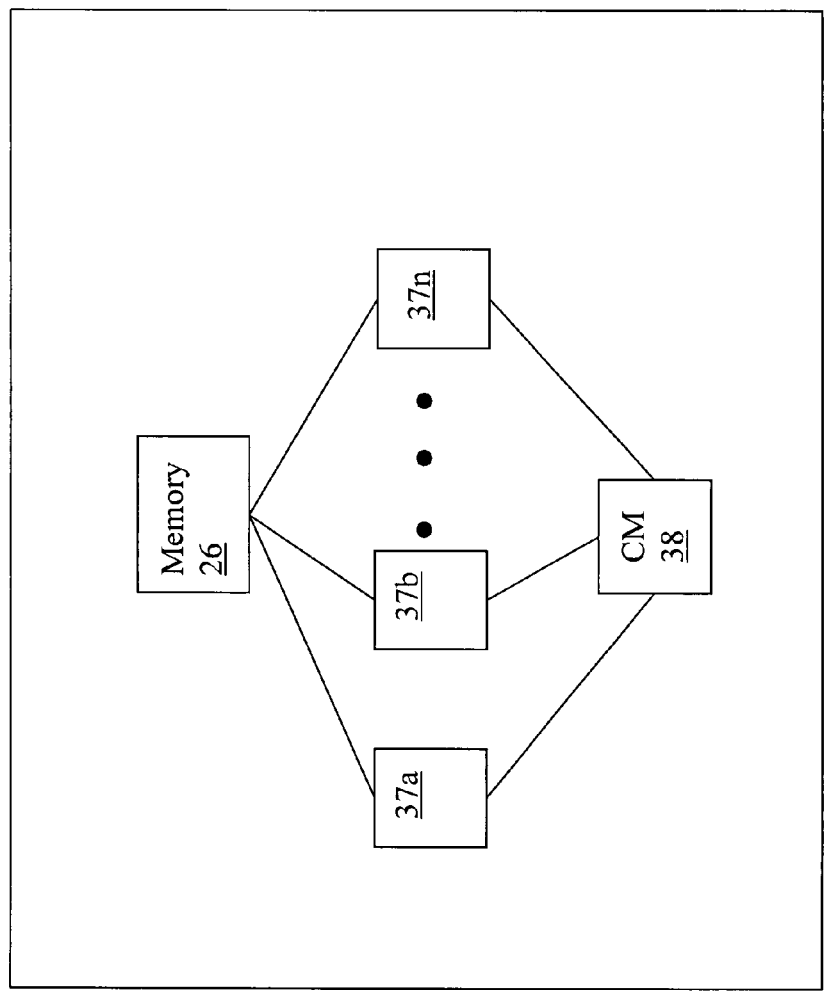
FIG. 2B is a representation of the logical internal communications between the directors and memory included in one embodiment of the data storage system of FIG. 2A.

Referring now to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary.

The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

Figure 3:
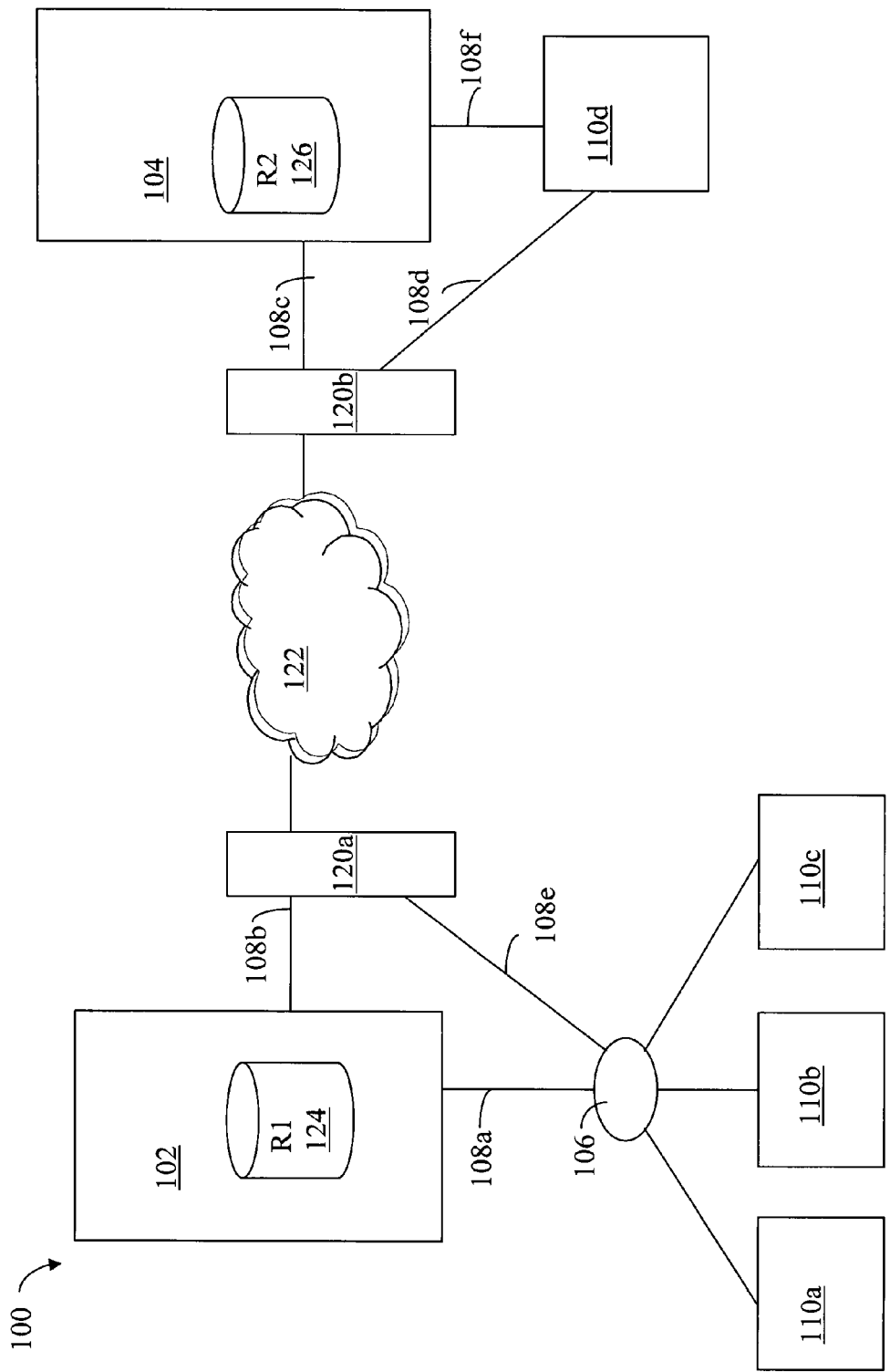
FIG. 3 is an example representation of components of a system that may be used in connection with the techniques herein.

Referring now to FIG. 3, shown is an example of an embodiment of a computer system 40 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104, hosts 110a, 110b, 110c and 110d, and appliances 120a and 120b. The appliances 120a and 120b may communicate over network 122, such as the Internet or other private network, and facilitate communications with the components connected thereto. The data storage systems 102 and 104 may be remotely connected and communicate over 122 through connections to the appliances 120a and 120b. Hosts 110a, 110b and 110c may perform operations to data storage system 102 over 106 and 108a. The hosts 110a, 110b and 110c may be connected to the data storage system 102 and the appliance 120a through 106 which may be, for example, a router or other network component. Host 110d may communicate with the data storage system 104 over connection 108f, and may communicate with the appliance 120d over connection 108d.

In one embodiment, each of the appliances 120a and 120b may be the WANJet® by F5 Networks. As will be described in following paragraphs, the appliances 120a and 120b may each perform one or more optimizations in connection with messaging traffic. The appliances may prioritize incoming and/or outgoing messaging traffic based on a prioritization policy including one or more prioritization rules. The foregoing prioritization policy in connection with messaging traffic is described in more detail in following paragraphs.

The data storage systems 102 and 104 may include one or more devices. In this example, data storage system 102 includes device R1 124 and data storage system 104 includes device R2 126. Both of the data storage systems may include one or more other logical and/or physical devices. Data storage system 102 may be characterized as local with respect to hosts 110a, 110b and 110c, and remote with respect to host 110d. Data storage system 104 may be characterized as local with respect to host 110d and remote with respect to hosts 110a, 110b and 110c.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the Remote Data Facility (RDF) product provided by EMC Corporation of Hopkinton, Mass. Data storage device communication between Symmetrix™ data storage systems using RDF is described, for example, in U.S. Pat. Nos. 5,742,792 and 5,544,347, both of which are incorporated by reference herein. With RDF, a user may denote a first storage device, such as R1, as a master storage device and a second storage device, such as R2, as a slave storage device. Other incarnations of RDF may provide a peer to peer relationship between the local and remote storage devices. In this example, the host 110a interacts directly with the device R1 of data storage system 102, but any data changes made are automatically provided to the R2 device of data storage system 104 using RDF. In operation, the host 110a may read and write data using the R1 volume in 102, and RDF may handle the automatic copying and updating of data from R1 to R2 in data storage system 104.

As illustrated in connection with other figures herein, data storage system 102 may have an RA included therein to facilitate remote connections over 108b to the data storage system 104. Communications between storage system 102 and 104 may be made over connection 108b, appliance 120a, network 122, appliance 120b and connection 108c. Data storage system 104 may include an RA for use in receiving the communications from the data storage system 102. The data storage systems may communicate over Gigabit Ethernet connections supporting TCP/IP traffic. The RDF functionality may be facilitated with the RAs provided at each of the data storage systems 102 and 104. Performing remote data communications using RDF over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. Among other things, U.S. Pat. No. 6,968,369 describes processing that may be performed by each of the data storage systems 102 and 104 in connection with facilitating communications therebetween such as, for example, encapsulating an RDF message within a TCP/IP message for outgoing transmission, and decapsulating a received TCP/IP message.

An embodiment may also include the concept of an RDF group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using RDF functionality.

It should be noted that although FIG. 3 illustrates an arrangement including 2 appliances 120a and 120b, an embodiment may use only a single appliance and does not require both for use with the techniques herein. An appliance, such as 120a, may accept as input a stream of TCP/IP packets and may also output a stream of TCP/IP packets so that a complementary appliance, such as 120b, is not required. Additionally, the placement or location of the appliance within the network may vary with embodiment.

Described in following paragraphs are techniques that may be used in connection with prioritizing messaging traffic. Such prioritization techniques may be used to provide a service allowing allocation of network resources, such as network bandwidth percentage, to messages having specific attributes or properties. The prioritization may be determined in accordance with a prioritization policy including one or more rules. The techniques herein for prioritization may be performed by code executing on the appliances 120a and 120b. It should be noted that the prioritization may be used in connection with one or more other operations, such as optimizations to the messaging traffic, as may be performed by the appliance. Additionally, it should be noted that although the prioritization technique as described herein is performed by an appliance, the code for performing the prioritization may be executed on any other type of network component, such as a router, for use in connection with performing other operations.

Figure 4:
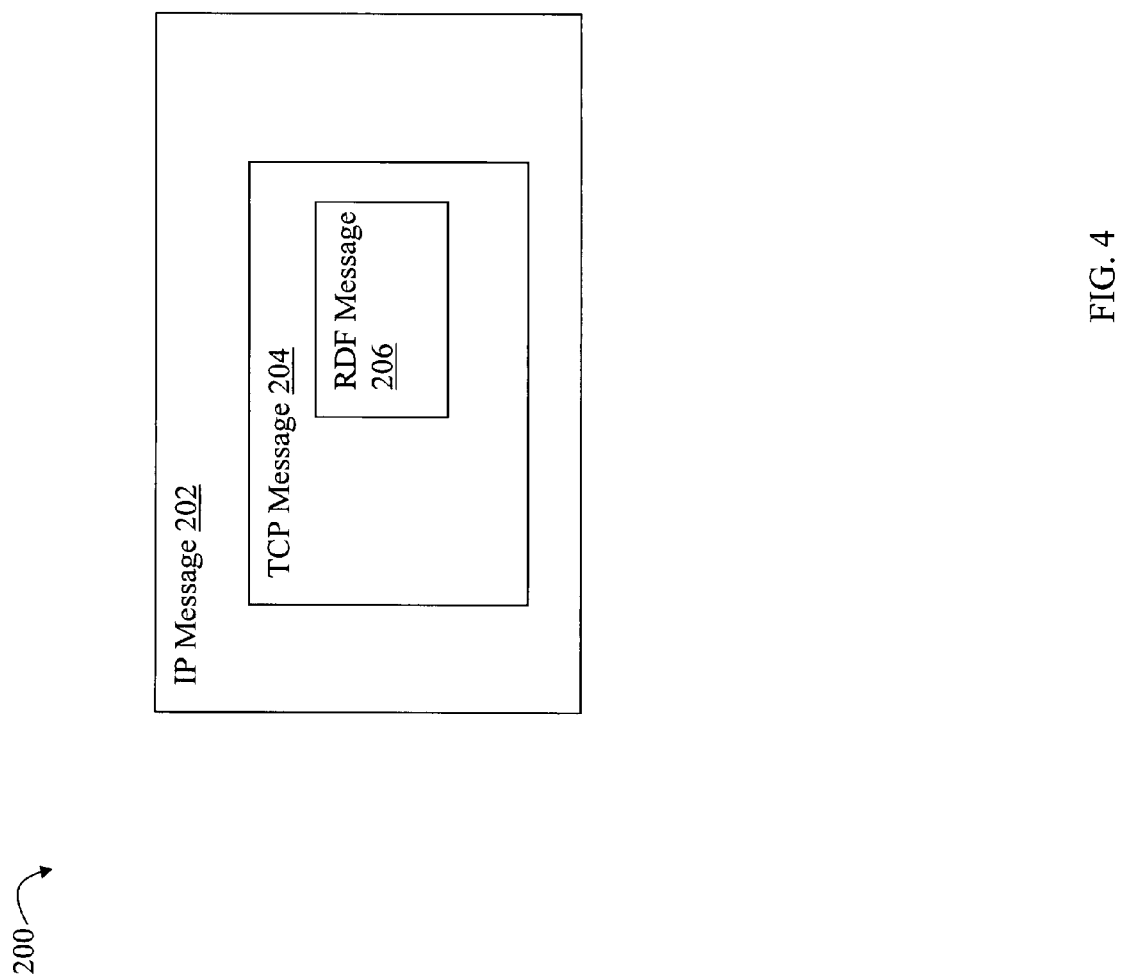
FIG. 4 is an example of messaging encapsulation.

Referring to FIG. 4, shown is an example representation of an encapsulated RDF message. The example 200 illustrates an RDF message 206 encapsulated within a TCP/IP message. More specifically, the IP message 202 includes the TCP message 204 and the RDF message 206 is included as part of the TCP message 204. As described herein, code may be executed on the data storage system, such as data storage system 102, to place the RDF message in an encapsulated form as represented in the example 200 for transmission over a TCP/IP connection.

As known in the art, the IP is a network layer protocol that contains addressing information and some control information enabling packets to be routed. The network layer corresponds to Layer 3 of the OSI Reference Model having the following 7 layers, from lowest (e.g., Level 1) to highest (Level 7): physical, link, network, transport, session, presentation, and application. TCP is a transport layer protocol that provides for reliable transmission of data in an IP environment. The transport layer corresponds to Layer 4 of the OSI Reference Model.

In the example, 200, a first message format, such as RDF, is encapsulated within another message format, such as that of a TCP/IP message. It should be noted that although both RDF and TCP/IP are described herein for purposes of illustration, other messaging formats and protocols may be used in connection with the techniques herein. For example, the RDF message may be encapsulated in accordance with another format besides TCP/IP depending on the network over which the message is sent.

Figure 5:
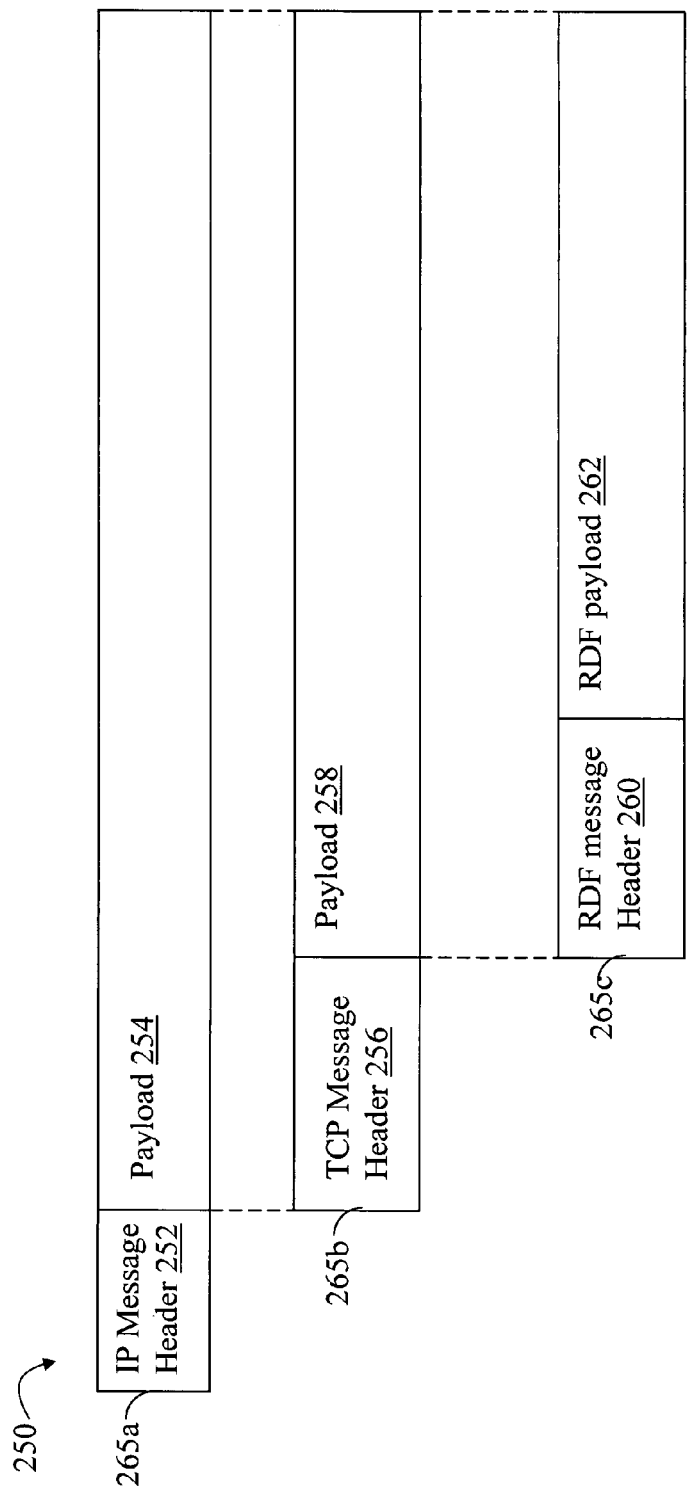
FIG. 5 is an example illustrating in more detail the messaging encapsulation and formats.

Referring now to FIG. 5, shown is an example illustrating a message that may be transmitted over a TCP/IP network. The example 250 includes additional detail on the portions of the message and encapsulation. The IP message 265a includes an IP message header 252 and a payload 254. The payload 254 of the IP message 265a includes the TCP message 265b. The TCP message 265b includes a TCP message header 256 and payload 258. The payload 258 of the TCP message 265b includes an RDF message 265c. The RDF message 265c includes an RDF message header 260 and payload 262.

It should be noted that the example of FIG. 5 illustrates an example when the RDF message 265c does not span more than a single TCP message payload 258. An example illustrating an RDF message spanning more than a single TCP message payload is described elsewhere herein.

Processing may be performed on the appliance 120a to extract the RDF message from the TCP stream. As known in the art, various fields in the IP header and TCP header may be used to perform performing the foregoing extraction and other processing.

Referring now to FIG. 6, shown is an example of fields that may be included in the IP header portion. The example 270 provides additional detail of element 252 of FIG. 5. The example 270 illustrates the IP header as including a version number 272, a source address 274, a destination address 276, and other information in accordance with the particular IP format. The source address 274 and destination address 276 may each specify an IP address, respectively, the sending and receiving IP addresses of the message including the IP header. Information included in the IP header, such as the version number 272, may be used to identify the header length that may vary with IP version. Such information may also be used to determine the beginning of the payload 254 of the IP message in order to extract the TCP message included therein.

Referring now to FIG. 7, shown is an example of fields that may be included in the TCP header portion. The example 280 provides additional detail of element 256 of FIG. 5. In this example, the TCP header may include a source port 282, destination port 284, data offset 286, and other information in accordance with the TCP format. The data offset 286 may be used to determine the start of the data portion or payload 258 of the TCP message 265b. The source port 282 and destination port 284 may each specify, respectively, the sending and receiving ports of the message including the TCP header portion.

In one embodiment as will be described in more detail in following paragraphs, the source port 282 and/or the destination port 284 may be used in combination with one or more fields of other information included in the TCP payload to distinguish RDF from non-RDF message traffic.

Figure 8:
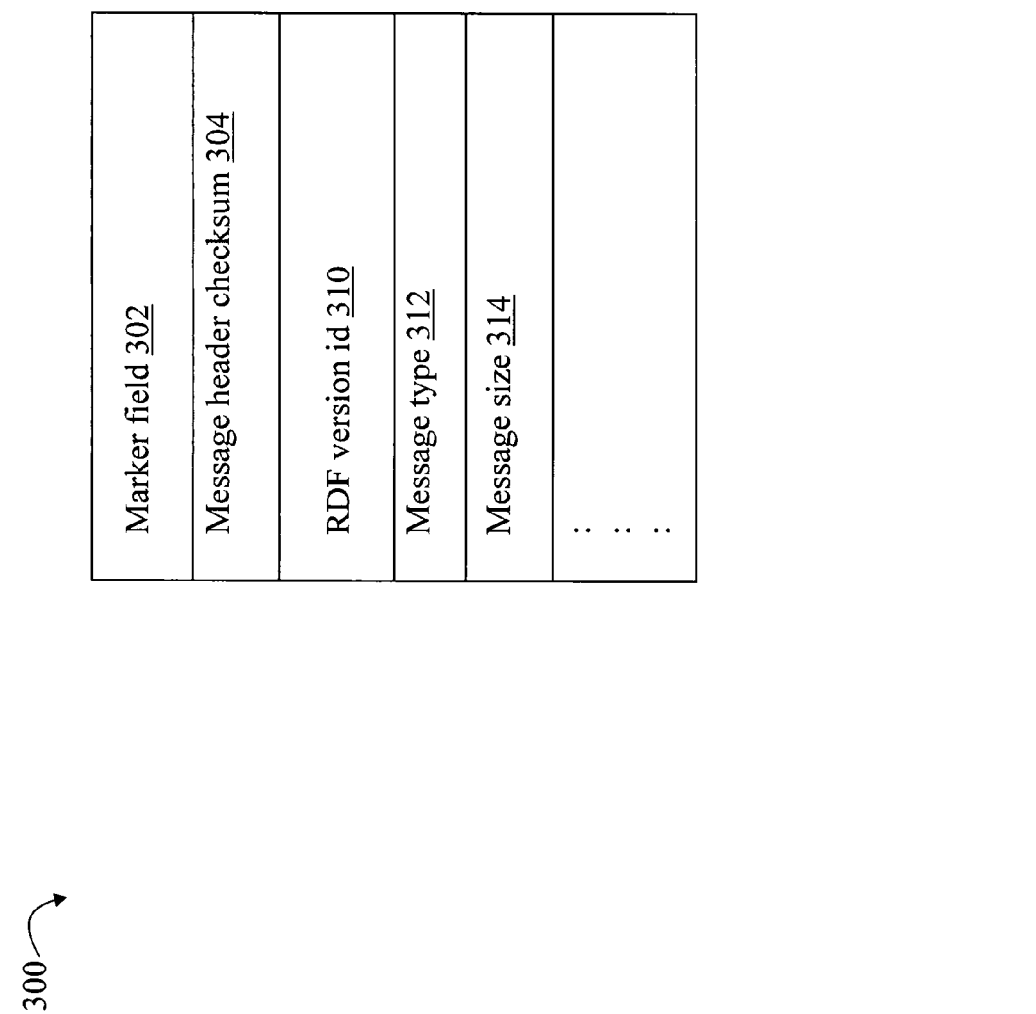
FIG. 8 is an example representation of an RDF message header.

Referring now to FIG. 8, shown is an example of fields that may be included an RDF message header. The example 300 provides additional detail of element 260 of FIG. 5. The example 300 includes a marker field 302, a message header checksum 304, an RDF version id 310, a message type 312, a message size 314, and may also include other information. The RDF message header may be the same size for all RDF messages.

The marker field 302 may be a predetermined value which is the same in each RDF message header. The message header checksum 304 may be a checksum value over the header fields in the example 300. In this example, the checksum may be a computed value that is dependent upon the contents of RDF header. The checksum value is sent along with the packet when it is transmitted. The receiver may compute a new checksum based upon the received RDF header and compares the computed checksum value with the checksum value included in the field 304. If the two values are the same, the receiver has a high degree of confidence that the data was received correctly. As described in following paragraphs, the RDF message header checksum 304 may also be used in combination with other values to distinguish RDF message traffic from non-RDF message traffic (i.e., determine whether a message includes an encapsulated RDF message). The RDF version id 310 may specify a version number of the RDF format and/or protocol.

The message type 312 may specify one of one or more different RDF message types. In one embodiment, the message types may include a command, response and data types as well as others that may be defined in an embodiment. Each message type may be associated with a unique value which, when included in the message type field 312, identifies an RDF message as being of the associated type. The RDF payload portion may have a varying data format depending on the message type field 312, as will be described in more detail in following paragraphs.

The message size field 314 indicates the size of the RDF message representing the size of the RDF header and the RDF message payload. It should be noted that if the RDF message payload spans multiple TCP message frames, the message size field 314 reflects the size of the complete RDF message payload as spanning the multiple TCP message frames. This is illustrated in more detail in following paragraphs.

In one embodiment, RDF traffic may be distinguished from non-RDF traffic based on whether the source port and/or destination port identifies a predetermined RDF port in combination with the marker field 302, the RDF version id 310, and message header checksum 304. The payload of a TCP message may be determined as including an RDF message if the following criteria are true:

1. the source port or destination port identifies a predetermined RDF port.
2. the marker field 302 includes the predetermined value.
3. the RDF version id 310 identifies a valid RDF version number.
4. the message header checksum 304 is valid.

If any one or more of the foregoing do not evaluate as expected, a received message is determined as being non-RDF traffic. If the foregoing criteria are met, processing may be performed in accordance with a determination that the received message includes an encapsulated RDF message in the TCP stream.

It should be noted that the foregoing is only one way in which an embodiment may distinguish RDF from non-RDF traffic for use in connection with prioritization as described herein. An embodiment may examine the RDF port in combination with one or more of the same or different values included in the TCP payload than as described herein to distinguish RDF from non-RDF traffic. Although there may be a lesser degree of confidence that a message is an RDF message, an embodiment may use a lesser number of items expected in an RDF message (e.g., included in the TCP payload) than as described above. For example, an embodiment may determine that a message includes an encapsulated RDF message using the TCP port number (item 1 above) and one additional item included in the TCP payload such as, for example, 1 of the 3 values described above (e.g., items 2-4 above). Alternatively, an embodiment may determine that a message includes an encapsulated RDF message using the TCP port number (item 1 above) and two additional items included in the TCP payload such as, for example, 2 of the 3 values described above (e.g., items 2-4 above) included in the TCP payload.

An embodiment may also distinguish RDF message traffic from non-RDF message traffic using only one or more fields from the TCP payload. For example, an embodiment may distinguish RDF traffic from non-RDF traffic by examining the contents of one of more fields from the TCP payload (e.g., one or more of items 2-4 above) without using the TCP port number.

An embodiment may use a target IP address, alone or in combination with one or more other criteria, to differentiate between RDF and non-RDF traffic. An IP target address may be used, for example, in an embodiment with fixed IP addresses. It will be appreciated by those skilled in the art that although a target IP address may be used to differentiate between RDF and non-RDF traffic, such an embodiment may encounter difficulties in accurately differentiating between RDF and non-RDF traffic depending on the particulars of the embodiment. An embodiment may experience the foregoing difficulties, for example, if the target IP address is dynamically assigned such as via DHCP (Dynamic Host Configuration Protocol), if the real IP target address has been modified due to firewalls performing NAT (Network Address Translation) translations, and the like.

Figure 9:
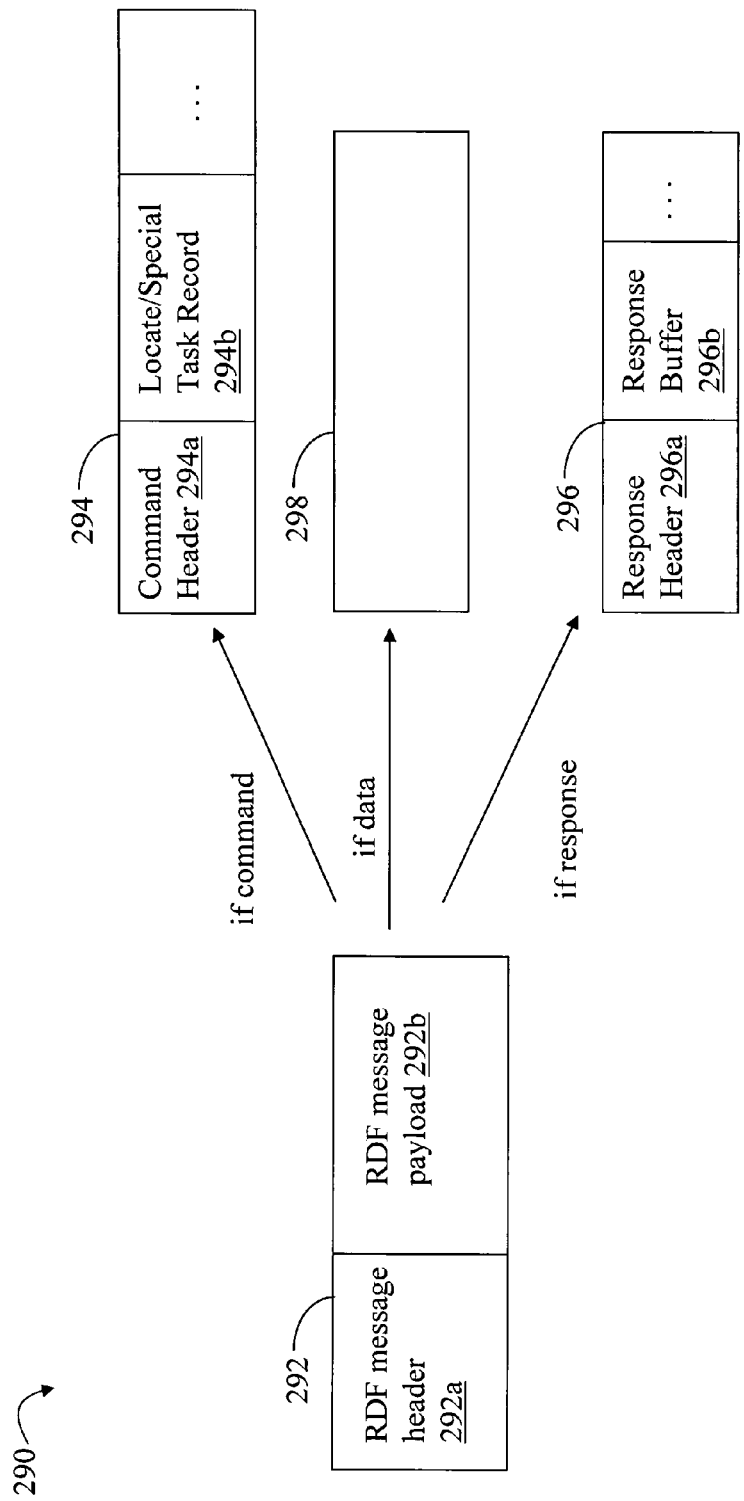
FIG. 9 is an example representation of an RDF message and the associated RDF message payload format in accordance with different RDF message types.

Referring now to FIG. 9, shown is an example representation of an RDF message as may be included in the TCP payload. The example 290 illustrates an RDF message 292 including an RDF message header 292a and an RDF message payload 292b. The RDF message payload 292b may be interpreted in accordance with any one of variety of different RDF message payload formats in accordance with the type of RDF message indicated in the message type 312 of the RDF message header 292a. In this example, the RDF message type may indicate that the RDF message is a command, data or a response message as well as other message types that may be utilized in an embodiment.

If the message type indicates a command, the format of 294 is used to interpret the RDF message payload 292b. The format 294 includes a command header portions 294a, a locate or special task record 294b, and possibly other information. The command header 294a may include some information describing the RDF message. The portion 294b functions as a locate record if the command is for data traffic, such as user data I/O (e.g., read and write) operations. The locate record describes the I/O in more detail such as the device location. The portion 294b functions as a special task record with a different format than the locate record if the command is related to management traffic. Management traffic may include commands executed in connection with performing, for example, control commands, remote system calls issuing ping commands to determine whether other data storage systems are up and running, commands in connection with performing discovery processing, and the like. In one embodiment, an RDF command related to management traffic (as distinguished from data traffic) may be identified by examining the data storage device identifier 402 in the command header 294a as illustrated in FIG. 10.

If the message type indicates data, the format of 298 is used to interpret the RDF message payload 292b. If the message type indicates a response, the format of 296 is used to interpret the RDF message payload 292b. The format 296 includes a response header portions 296a, a response buffer portion 296b and possibly other information.

Figure 10:
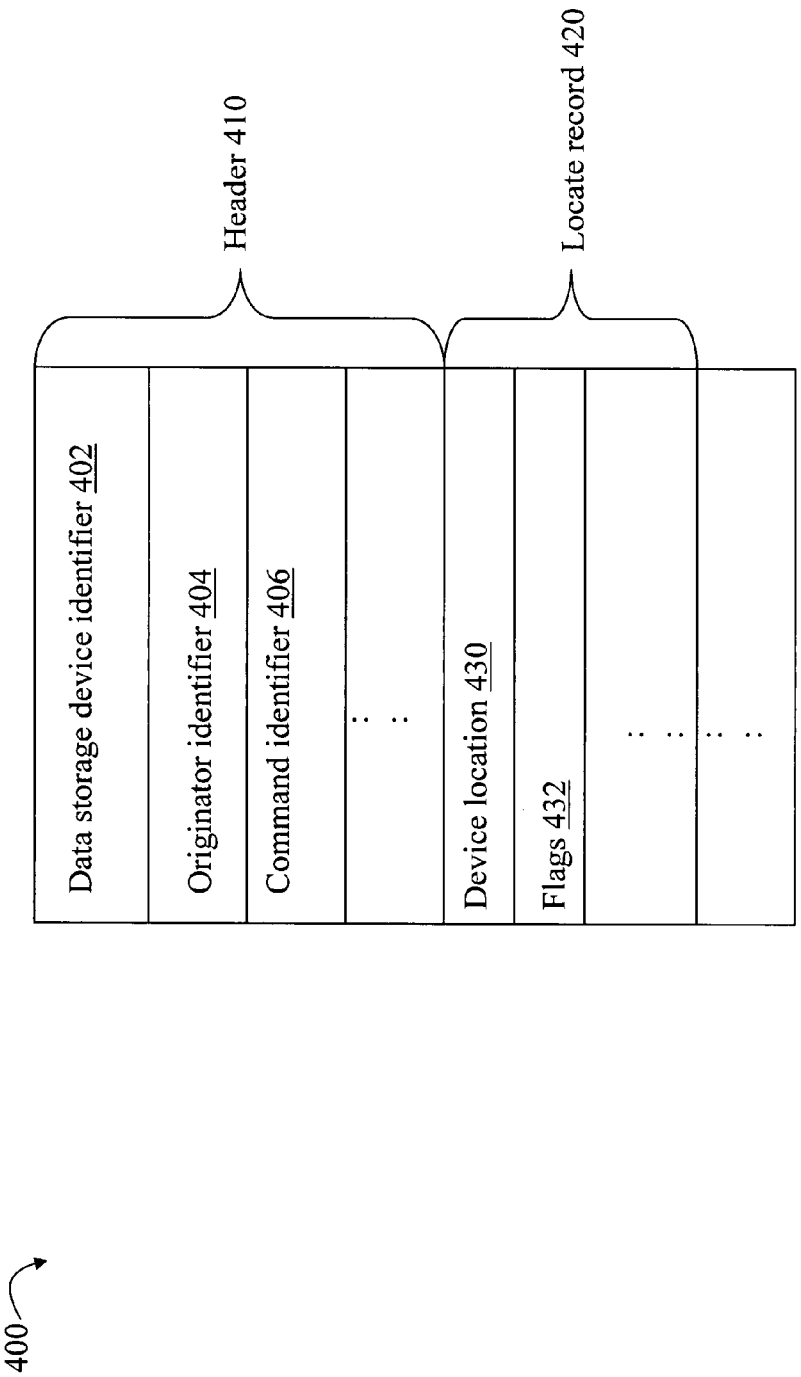
FIG. 10 is an example representation of an RDF message payload if the message is a command.

Referring now to FIG. 10, shown is an example representation of the RDF message payload fields if the message type indicated in the RDF message header is a command. The example 400 includes a header portion 410. The header portion 410 includes a data storage device identifier 402, an originator identifier 404, a command identifier 406, and possibly other data fields. The data storage device identifier 402 may identify a particular device of a data storage system to which the command is directed. As described in more detail elsewhere herein, an embodiment may specify one or more devices of a particular group of devices having priority using one or more rules that may be used to configure the appliance or other device performing the prioritization processing. As described above, an RDF message that is a command may be related to data traffic or management traffic. In one embodiment, if the command is related to management traffic, field 402 may have a value which indicates this is management traffic. For example, one or more data storage identifier values may be reserved and used to indicate management traffic commands when included in field 402. The originator identifier 404 is an identifier associated with the originator of this command. In one embodiment, the identifier 404 may be an identifier used, for example, by the RAs or other component of the data storage system. For example, in an embodiment performing prioritization of another vendor-specific type of messaging traffic (other than RDF) over other messaging traffic, a different vendor-specific identifier may be used similar to as described herein. The command identifier 406 indicates the type of I/O operation, such as a read or write operation.

If the command is a data traffic command, the portion 420 is interpreted as a locate record including a device location 430, flags 432, and possibly other fields. If the command relates to management traffic, portion 420 may be characterized as a buffer whose contents vary with the particular management task performed.

When portion 420 is interpreted as a locate record, the device location 430 may identify the device location of the I/O command. For example, if the I/O operation is a write operation, the device location may identify the location on the device to which the write operation is directed. The flags field 432 may include one or more bit flag values. In one embodiment, the field 432 may include one or more bits. One of the bit setting in 432 may be used to indicate whether the command of the RDF message is a host initiated I/O or a non-host initiated I/O. In connection with RDF, this bit setting may indicate whether the command is host initiated causing data to be written to the R1 device, or whether the command may be characterized as non-host initiated or an RDF "copy" operation to copy data from the R1 to the R2 device.

Figure 11:
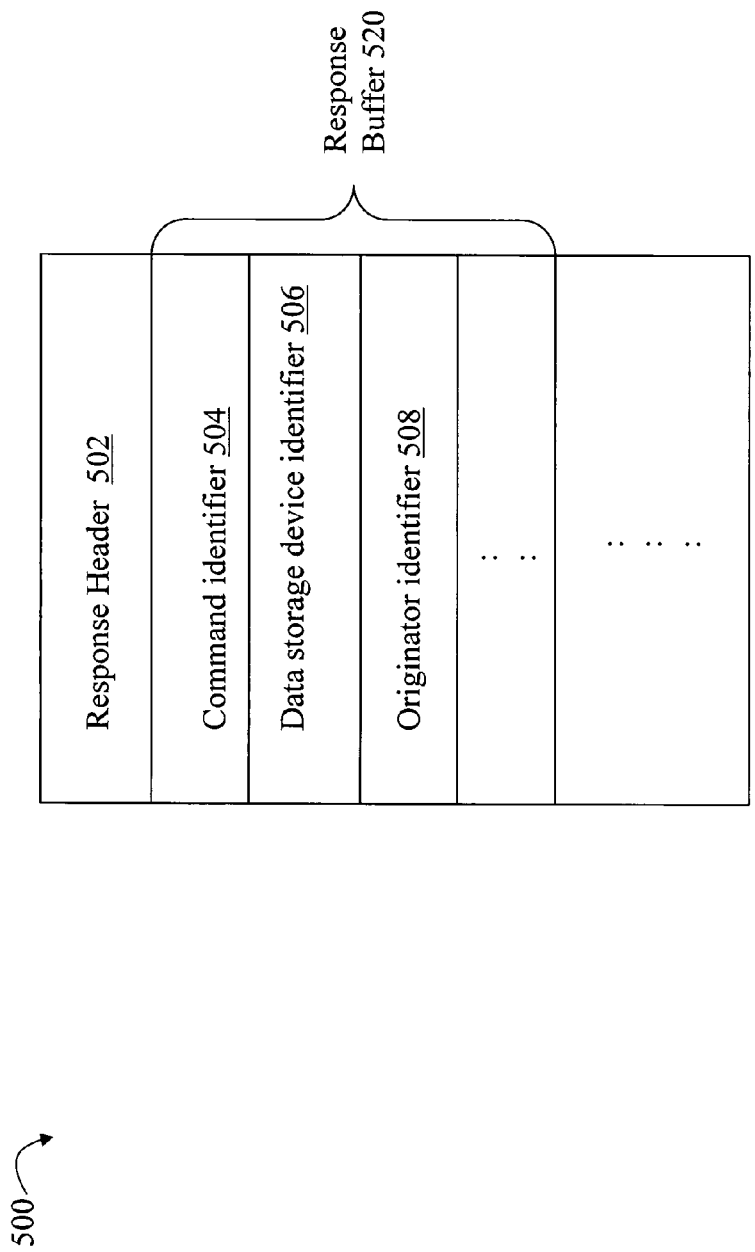
FIG. 11 is an example representation of an RDF message payload if the message is a response.

Referring now to FIG. 11, shown is an example representation of the RDF message payload fields if the message type indicated in the RDF message header is a response. The example 500 includes a response header 502 and multiple fields comprising the response buffer 520. In one embodiment, the response buffer 520 may include a command identifier 504, a data storage system device identifier 506 and an originator identifier 508. Fields 504, 506, and 508 are respectively analogous to fields 402, 404 and 406 as described in connection with FIG. 10 with RDF command messages. Fields 504, 506 and 508 may be used to match a response with a corresponding RDF command based on the foregoing fields.

In accordance with techniques herein, processing may be performed on the appliances 120a, 120b for prioritizing messaging traffic. In accordance with rules defining a prioritization policy, processing may be performed to make an initial determination as to whether a message is an RDF message. If the message is an RDF message, additional processing may be performed based on one or more rules of the traffic prioritization policy. The rules may provide priority for one particular type of RDF message over other RDF messages. For example, a prioritization policy may include a rule which provides priority for RDF command messages destined for one or more specified devices included in the rule. The one or more specified devices may be included in a device list. Any RDF command message destined for a device included in the device list is given priority over RDF traffic for other devices not included on the device list. The foregoing device of an RDF command message may be determined by examining the data storage device identifier 402 of the command header portion 410 of an RDF command message. An RDF command message may be determined if the message type 312 of the RDF message header in FIG. 8 indicates a command. Prioritization may also be extended to RDF response messages and other RDF traffic for the device. As described above, the device associated with an RDF response message may be determined using field 506 of the response buffer 520 as illustrated in FIG. 11. An RDF response message may be determined if the message type 312 of the RDF message header in FIG. 8 indicates a response type. An embodiment may specify one or more devices of a particular group of devices having priority in one or more rules used in configuring the appliance or other device performing the prioritization processing. An embodiment may also utilize a GROUP IDENTIFIER associated with a group of devices. The GROUP IDENTIFIER may be included in a field of the RDF message header 292a or payload 292b. Prioritization rules may be specified using the GROUP IDENTIFIER. The appliance or other device performing the prioritization may obtain a list of the devices that belong to the group indicated by GROUP IDENTIFIER. The list of devices may be defined (e.g., via a user interface and stored on the appliance or elsewhere) and obtained by the appliance for use in performing the prioritization.

A prioritization policy may also include a rule in which there is prioritization given to one or more types of RDF traffic over other types of RDF traffic. For example, priority may be performed in accordance with whether an RDF message is for a host-initiated I/O causing data to be written to the R1 device, or whether the command is non-host initiated or an RDF "copy" operation to copy data from the R1 to the R2 device. The host initiated I/O may be given priority over the non-host initiated or RDF copy operation to copy data from the R1 to the R2 device. As described above, whether an RDF command for an I/O is host-initiated or an RDF "copy" operation may be indicated by a bit setting in the flag field 432 of FIG. 10 of an RDF command message. An RDF command message may be determined if the message type 312 of the RDF message header in FIG. 8 indicates a command. In one embodiment, higher priority may be given to the host-initiated I/Os over the RDF "copy" operation I/Os.

A prioritization policy may also include a rule which provides prioritization for commands which are management traffic rather than data traffic. As described above, a special data storage system device identifier value may be included in field 402 of the command header portion 410 of an RDF command message to indicate that a command is for management traffic (e.g., See FIG. 10). An RDF command message may be determined if the message type 312 of the RDF message header in FIG. 8 indicates a command. The rule may specify that management traffic has priority over data traffic, or vice-versa.

A prioritization rule may also be defined which gives priority to RDF traffic for synchronous RDF I/O operations over asynchronous RDF I/O operations. In connection with RDF, the host may issue a write to an R1 device in a first data storage system and the data change is propagated to the R2 device in a second data storage system. As discussed in U.S. Pat. No. 5,544,347, RDF can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. A rule may be defined which performs prioritization based on whether RDF traffic is for asynchronous RDF or synchronous RDF. For example, a rule may be defined which gives priority to synchronous RDF traffic over asynchronous RDF traffic since synchronous RDF operations may have a greater host impact and thus completed as quickly as possible. With synchronous RDF, a host cannot proceed to the next I/O until a synchronous RDF I/O has completed. Alternatively, a rule may be defined giving priority to asynchronous RDF traffic over synchronous RDF traffic. In one embodiment, whether a command is related to synchronous RDF or asynchronous RDF may be determined by examining another bit in the flag field 432 of FIG. 10.

A prioritization rule may be defined which gives priority to a response message for a corresponding command message of a particular command type, such as read or write commands designated for a particular data storage system device. As described above, fields 402, 404 and 406 of the RDF command header 410 of FIG. 10 may be respectively compared to fields 506, 508 and 504 of an RDF response message (see FIG. 11) to match corresponding command and response messages. A rule may be defined which provides priority for a response message having a matching previous command message in which the response message also has one or more of: a particular RDF command (e.g., read or write operation, field 406), a particular data storage system device identifier (field 402), and/or a particular originator identifier (field 404). For example, a rule may be defined which gives priority to all responses matching a previous command in which the RDF command is for a write operation to a particular data storage system device. Rather than have a rule providing priority to response having certain characteristics or attributes, the rule may specify that priority is given to all RDF response messages over other RDF traffic.

A prioritization rule may be defined which is also a combination of criteria as described herein. For example, a rule may be defined that provides priority for host-initiated I/O for a particular R1 device, provides priority for an RDF "copy" to a particular R2 device, and the like.

The foregoing are just some examples of one or more prioritization rules that may be included in a traffic prioritization policy. The prioritization policy provides control over network utilization based on application-level priorities that may be adjusted over time, for example, in accordance with customer replication schedules, relative application and device importance, and other prioritization based on non-network characteristics. For example, the prioritization policy may be modified in accordance with performing backup operations for particular devices at different times. Priority may be given to those devices at specified times in accordance with a backup schedule as also defined in the prioritization rules. Additionally, data traffic for an application may be directed to one or more particular devices. As such, rules providing priority for certain devices may result in providing priority to data traffic for certain applications, such as those executing on a host or server, over other applications.

Figure 12:
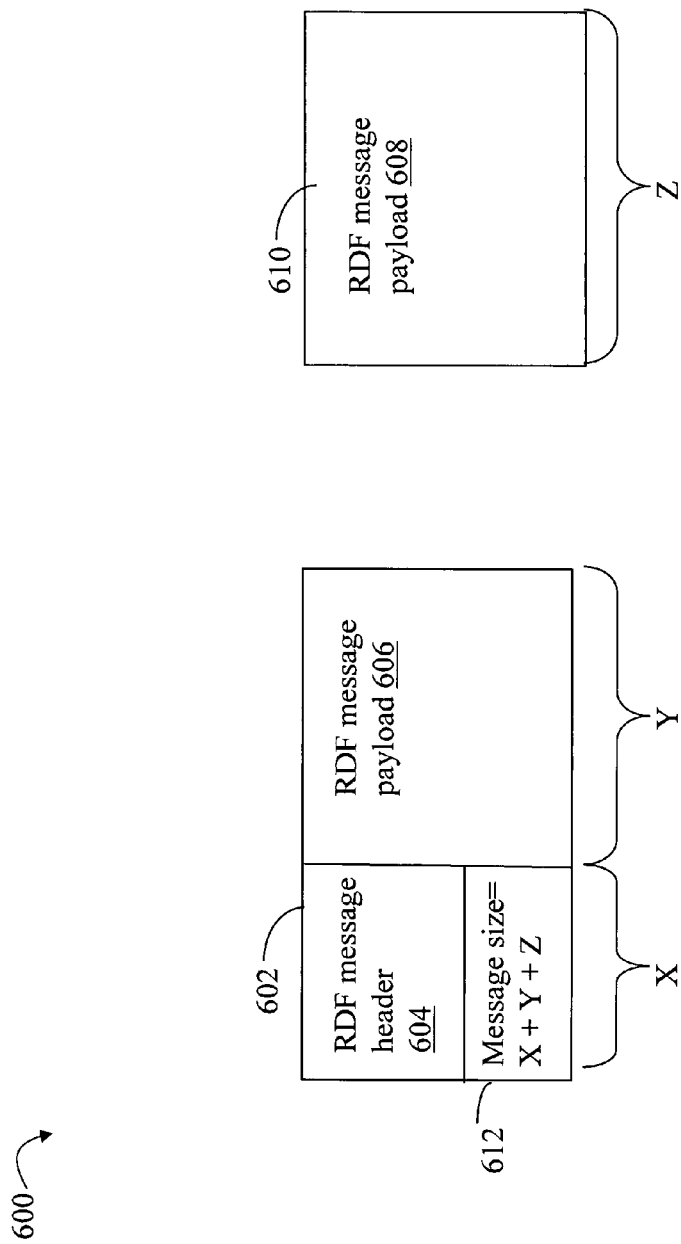
FIG. 12 is an example representation of an RDF message that may be included in two TCP message payloads.

It has been noted that an RDF message may be encapsulated in the TCP stream into more than a single TCP message payload. FIG. 12 illustrates such an example 600 in which a single RDF message spans two TCP frames. The TCP payload portion of the first TCP message is represented as 602 and includes an RDF message header 604 which has a size X and an RDF message payload 606 having size Y. The TCP payload portion of the second TCP message is represented as 610 having a size Z. The header 604 includes a message size field indicating a value for the message size of X+Y+Z. The appliance 120a, 120b of FIG. 3 may include code for reconstructing the RDF message from the TCP message stream. The code may provide for reconstructing RDF messages as illustrated in the example 600 spanning more than a single TCP message payload. Using the message size 612, the code may look to one or more successive TCP message payloads to construct the RDF message prior to performing the techniques herein. In connection with the example 600, it may be determined after the first TCP message payload that an additional Z bytes of data are remaining for the RDF message. The remaining Z bytes are obtained from the payload of the next successive TCP message. If the current size of the RDF message is still less than that as indicated by the message size, the payload of the next success TCP message in the incoming stream is also used in forming the same RDF message. The foregoing is repeated until all bytes of the current RDF message as indicated by the message size field 612 are obtained from the TCP stream.

Figure 13:
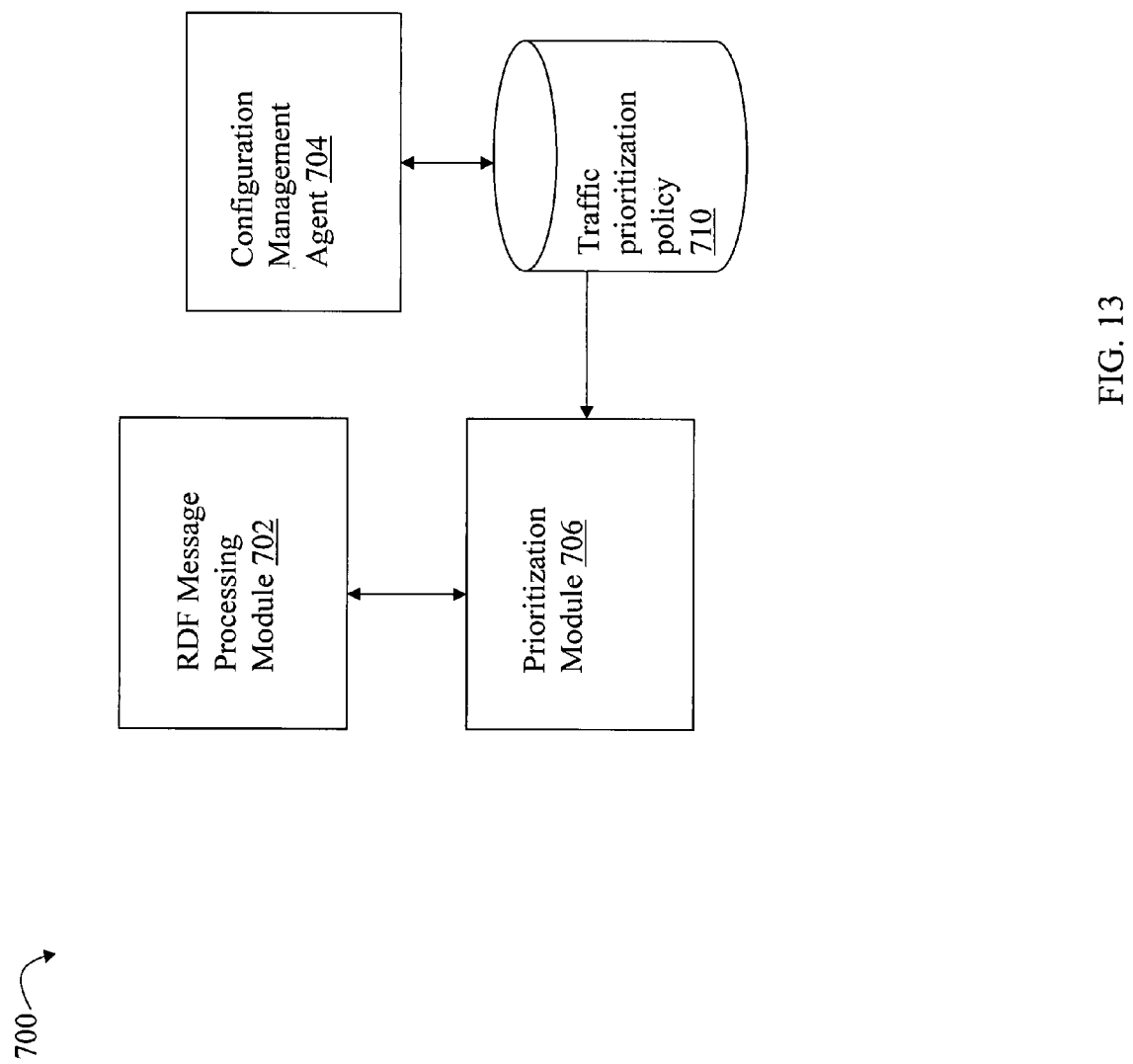
FIG. 13 is an example of components that may be included on an appliance performing prioritization using the techniques herein.

Referring now to FIG. 13, shown is an example 700 of modules that may be included in the appliance, such as 120*a*, 120*b*. The example 700 includes an RDF message processing module 702, a configuration management agent 704, a prioritization module 706, and a traffic prioritization policy 710. The configuration management agent 704 may be used in connection with defining the one or more rules of the traffic prioritization policy. The rules may be entered interactively using a command line or other interface provided locally at the appliance or remotely. For example, a remote component may be executed on a host or other computer to enter the prioritization rules. The prioritization rules may be communicated by the remote component to the agent 704 which stores the one or more rules, or changes thereto, in the traffic prioritization policy 710. The rules may be dynamically configurable and modifiable by a user during operation of the appliance. The prioritization module 706 may read the one or more rules included in the traffic prioritization policy 710 to perform prioritization of received messages. The RDF message processing module 702 may perform processing to extract data from the TCP message payloads and construct the RDF messages from the received stream of TCP messages. The prioritization module 706 may communicate with the RDF message processing module 702 to obtain RDF messages and examine particular values of fields included therein. The prioritization module 706 may query the module 702 for the next RDF message and for determining if the RDF message contains fields having particular values in accordance with one or more rules of the traffic prioritization policy. For example, if a rule indicates that priority is given to RDF commands for a particular data storage system device (e.g., based on field 402 of the RDF command header 410 of FIG. 10) over RDF traffic for other devices, the module 706 may communicate with the module 702 to determine if the next RDF message is a command having for a particular device indicated in the rule has having such priority.

It should be noted that the prioritization rules in an embodiment may be in any one of a variety of different formats and forms. The rules may specify one or more criteria used to prioritize messaging traffic. In one embodiment, the rules may specify one or more criteria which are logically combined to determine which messaging traffic is given priority over other messages not meeting the criteria. In such an embodiment, the rules may be used to specify two classes of messaging traffic where one class meeting the criteria is given priority over other messaging traffic not meeting the criteria.

In one embodiment, the output of the appliance may also be a TCP/IP message stream. In another embodiment, the form of the output by the appliance may vary depending on whether the data is being communicated to another appliance or other component. For example, referring back to FIG. 3, if the appliance 120*a* communicates with appliance 120*b*, all communications therebetween may be a TCP/IP message stream as well as messages in accordance with another format understood by the appliances 120*a* and 120*b*. For example, appliance 120*a* may communicate a constructed RDF message to the appliance 120*b* in another format without encapsulating the RDF message in accordance with the TCP/IP protocol. The output may the constructed RDF message which may also be encapsulated within in another messaging protocol for communications between the appliances 120*a* and 120*b*. When one of the appliances 120*a*, 120*b* communicates with components other than another appliance of the same type, by the same vendor, and the like, the appliance may output messages in accordance with TCP/IP or another protocol used by the components being communicated with.

Figure 14:
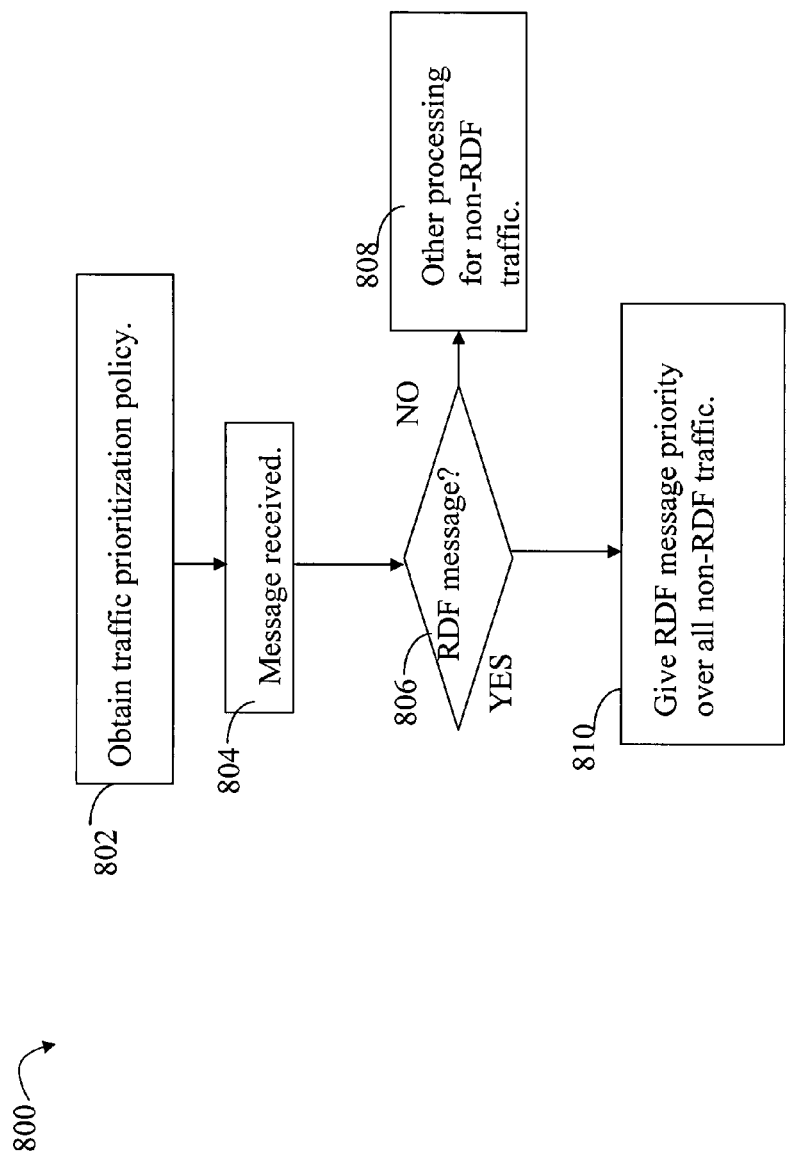
FIGS. 14 and 15 are flowcharts of processing steps that may be performed in an embodiment using the techniques herein.

Referring now to FIG. 14, shown is a flowchart of processing steps that may be performed in an embodiment using the techniques herein. The steps of 800 summarize processing described above in which priority may given to RDF traffic over all non-RDF traffic. At step 802, a traffic prioritization policy including one or more prioritization rules is obtained. The rules may be defined interactively, stored in a file, and the like. In this example, the prioritization policy may include a single condition indicating that priority is given to all RDF traffic over all non-RDF traffic. At step 804, an incoming message of the TCP/IP stream of messages is received. A determination is made at step 806 as to whether the message is an RDF message. Various ways of distinguishing between RDF and non-RDF traffic are described herein. If step 806 determines that the message is not an RDF message, control proceeds to step 808 to perform other processing for non-RDF traffic. If step 806 evaluates to yes, control proceeds to step 810 where the message is given priority over other non-RDF traffic. In one embodiment, different queues may be given different priorities and a message may be accordingly placed in an appropriate priority queue for further processing. For example, one embodiment may include two message queues. RDF messages may be included in a first queue and given priority for processing over non-RDF messages in a second queue.

Besides giving priority to RDF traffic over non-RDF traffic, an embodiment may further give RDF traffic meeting one or more criteria defined in the prioritization rules priority over other types of RDF traffic. In such an embodiment, for example, three queues may be used—one for non-RDF traffic, a second for RDF traffic that does not meet the one or more criteria, and a third queue for RDF traffic that does meet the one or more criteria. The order of priority, from highest to lowest, may be messages on the third queue, second queue, and then first queue.

Figure 15:
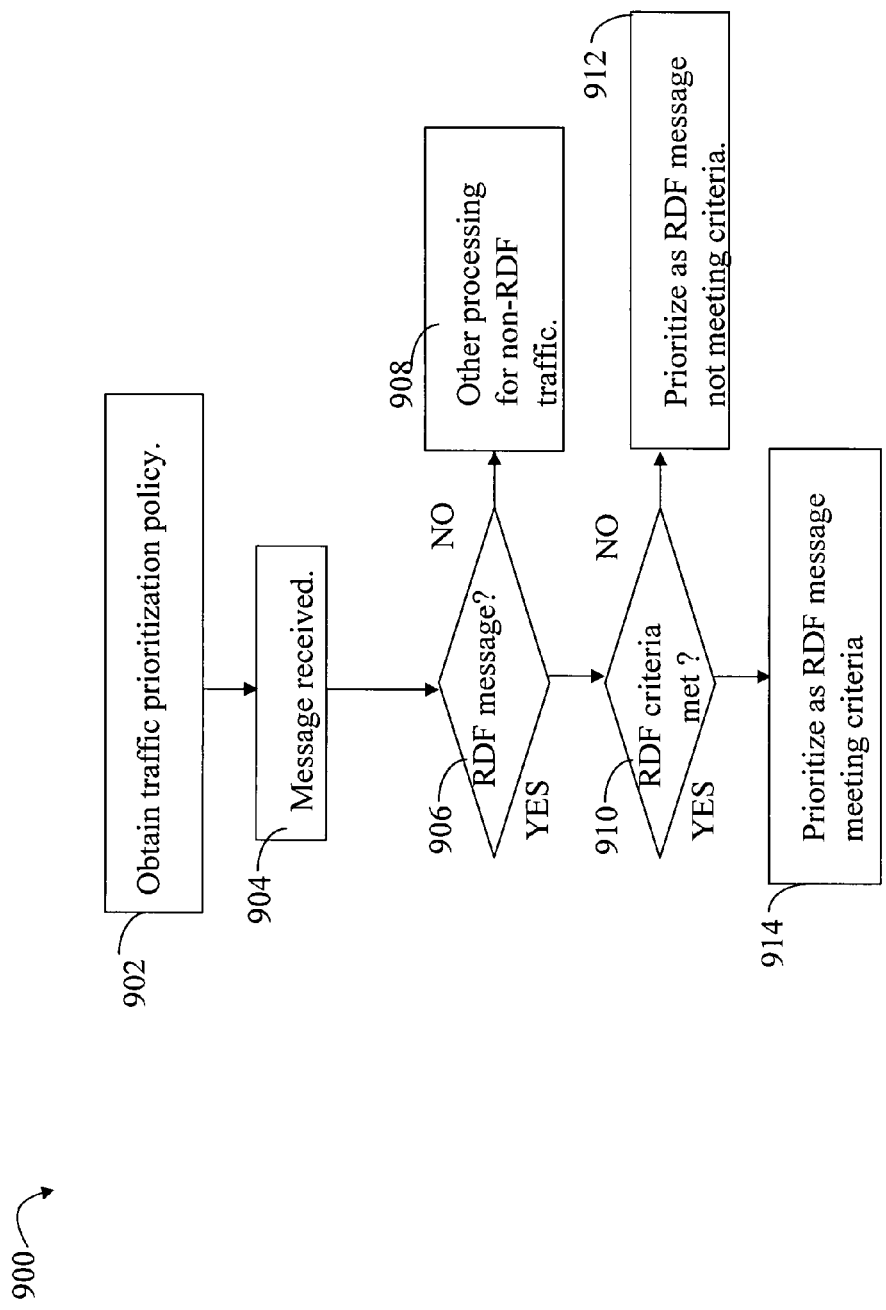

Referring to FIG. 15, shown is a flowchart of processing steps that may be performed in an embodiment providing priority to one or more types of RDF traffic over other RDF traffic. It should be noted that the flowchart 900 may be used to provide a three-tiered priority structure as just described above. Steps 902, 904, 906, and 908 are respectively analogous to steps 802, 804, 806, and 808 of FIG. 15. In step 908, the message may be placed in the first queue described above. After step 906, once it has been determined that the message is an RDF message, a determination is made at step 910 as to whether the current RDF message meets the one or more criteria specified in the prioritization rules. If not, control proceeds to step 912 to prioritize the message as an RDF message not meeting the specified prioritization criteria. In step 912, the message may be placed in the second queue described above. If step 910 evaluates to yes, control proceeds to step 914 to prioritize the message as an RDF message meeting the prioritization criteria of the prioritization rules. In step 914, the message may be placed in the third queue described above.

As a variation to FIG. 15 processing, an embodiment may utilize a two-tier priority in which steps 908 and 912 assign a same low priority to a message and step 914 assigns a second higher priority to the message. In this example, only RDF messages meeting specified criteria are given priority over other messaging traffic. If the RDF message does not meet the criteria, it may be given the same priority as non-RDF traffic.

It should be noted that an embodiment may also provide for defining a prioritization policy having a hierarchy or classification structure in which a relative priority ordering may be associated with each class. Each class may have one or more associated rules. Members of each class may be determined by whether an RDF message meets the one or more criteria of each rule associated with the class.

The one or more prioritization rules may be specified by a user, for example, as with interactive input, data from a file or other data store, and the like. The prioritization rules may also be determined by executing code which may modify or define configuration rules automatically. For example, rules may specify that during particular dates and/or time of day, certain types of traffic have priority over other types of traffic. Executing code may monitor changes in time, date, and the like, and, in response to such changes, the code may automatically modify the rules. Such processing may be performed, for example, with different applications whose RDF traffic is given priority at different times of the day, days of the week, and the like.

The prioritization techniques described herein may be used in connection with performing prioritization for one or more other operations that may vary with embodiment. For example, messaging traffic of a particular priority may be allocated a designated network bandwidth percentage. As another example, the prioritization may refer to an ordering applied to messages in connection with other optimizations, routing, and the like that may be performed by the appliance, or other component utilizing the prioritization techniques herein. By providing priority to one or more types of messaging traffic, the appliance or other component performing the prioritization may provide different quality of service (QoS) levels to particular messaging streams, for example, as may be associated with data operations for RDF as described herein, one or more applications executing on a host, and the like.

It should be noted that the foregoing prioritization may be used in connection with prioritizing messaging traffic between data storage systems to distinguish data storage system messaging traffic from other messaging traffic so that priority may be given to the data storage system messaging traffic. However, it will be appreciated by those skilled in the art that the prioritization techniques herein may also be used in connection with distinguishing between, and giving priority to, other types of messaging traffic.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for prioritizing messaging traffic comprising:
   receiving, using a computer processor, a first message having a second message encapsulated in a payload of the first message; and
   determining, using a computer processor, whether the first message meets one or more prioritization criteria in accordance with one or more portions of a payload of the second message, wherein said determining whether the first message meets one or more prioritization criteria includes determining whether the payload of the second message includes a third message in accordance with a messaging protocol, the third message is determined as being included in the payload of the second message if the header of the second message has a predetermined port number for the messaging protocol and if the one or more portions include valid values in accordance with the messaging protocol.

2. The method of claim 1, wherein the first message is in accordance with a network layer protocol.

3. The method of claim 1, wherein the second message is in accordance with a transport layer protocol.

4. The method of claim 1, wherein the first message is in accordance with an internet protocol and the second message is in accordance with a transport control protocol.

5. The method of 1, further comprising:
   determining, using a computer processor, whether the second message includes the third message encapsulated in the payload of the second message using portions of the payload of the second message.

6. The method of claim 1, wherein the one or more portions of the payload of the second message comprise a marker field including a predefined value, a message header checksum including a checksum over a header portion having an expected size of the third message encapsulated in the payload of the second message, and a version identifier identifying a format version of said third message.

7. The method of claim 6, wherein priority is given to said first message over other messages not having a message encapsulated therein in accordance with the messaging protocol.

8. The method of claim 7, wherein said messaging protocol is for a remote data facility and the first message is messaging traffic between data storage systems over a network.

9. The method of claim 1, wherein, if the first message meets one or more prioritization criteria in accordance with one or more portions of the payload of the second message, determining that the first message is messaging traffic between data storage systems over a network in accordance with a protocol for a remote data facility, and giving priority to the first message over other messages not in accordance with the protocol for the remote data facility.

10. The method of claim 9, wherein the prioritization criteria are included in one or more rules of a traffic prioritization policy.

11. The method of claim 10, wherein the traffic prioritization policy includes one or more rules for prioritizing message traffic based on a type of messaging traffic in accordance with the protocol of said remote data facility.

12. The method of claim 10, wherein the traffic prioritization policy includes a rule for prioritizing based on a device for an I/O operation indicating in said payload of the second message.

13. The method of claim 10, wherein the traffic prioritization policy includes a rule for prioritizing based on whether a message is management traffic for performing a data storage management operation or data traffic for performing an operation related to user data.

14. The method of claim 10, wherein the remote data facility provides for automatically copying data from a first device to a second device in response to changes made to data on the first device, and the traffic prioritization policy includes a rule for prioritizing based on whether a message is a message including a command to modify data on the first device or a message including a command to update said second device in response to changes to said first device.

15. The method of claim 10, wherein the remote data facility provides for automatically copying data from a first device to a second device in response to changes made to data on the first device, and the traffic prioritization policy includes a rule for prioritizing based on whether messaging traffic is for performing said copying in accordance a host receives an acknowledgment regarding said copying after data is committed to said first device and, when in the synchronous mode, said host receives an acknowledgment regarding said copying after data is committed to said second device.

16. A system comprising:
two or more data storage systems connected by a network;
at least one network component performing prioritization of messaging traffic between said two or more data storage systems, wherein the at least one network component includes executable code stored on a computer readable medium for:
receiving a first message including a first header and a first payload, said first payload comprising a second message including a second header and a second payload;
determining whether said second payload includes a third message comprising a third header and third payload in accordance with a messaging protocol, said determining being performed using one or more portions of said third header and a portion of said second header;
in response to determining that said first message includes a third message in accordance with said messaging protocol, prioritizing said first message over other messaging traffic not in accordance with said messaging protocol.

17. The system of claim 16, wherein the network handles messaging traffic in accordance with TCP/IP.

18. The system of claim 17, wherein the messaging protocol is a protocol associated with a remote data facility that automatically copies data from a first device to a second device in response to changes made to data on the first device.

19. A computer readable medium comprising executable code stored thereon for prioritizing messaging traffic, the computer readable medium comprising executable code for:
receiving a first message having a second message encapsulated in a payload of the first message; and
determining whether the first message meets one or more prioritization criteria in accordance with one or more portions of a payload of the second message, wherein determining whether the first message meets one or more prioritization criteria includes determining whether the payload of the second message includes a third message in accordance with a particular messaging protocol, the third message is determined as being included in the payload of the second message if the header of the second message has a predetermined port number for the particular messaging protocol and if the one or more portions include valid values in accordance with the particular messaging protocol.

\* \* \* \* \*